United States Patent
Yu et al.

(10) Patent No.: US 10,289,519 B2
(45) Date of Patent: May 14, 2019

(54) RACK MANAGEMENT SYSTEM AND RACK MANAGEMENT METHOD THEREOF

(71) Applicant: Wistron Corporation, New Taipei (TW)

(72) Inventors: Pei-Ling Yu, New Taipei (TW); Shih-Tang Shen, New Taipei (TW); Bing-Kun Syu, New Taipei (TW)

(73) Assignee: Wiwynn Corporation, New Taipei (TW)

( * ) Notice: Subject to any disclaimer, the term of this patent is extended or adjusted under 35 U.S.C. 154(b) by 752 days.

(21) Appl. No.: 14/510,387

(22) Filed: Oct. 9, 2014

(65) Prior Publication Data
US 2015/0193320 A1    Jul. 9, 2015

(30) Foreign Application Priority Data

Jan. 8, 2014 (TW) .............................. 103100723 A

(51) Int. Cl.
*G06F 11/30* (2006.01)

(52) U.S. Cl.
CPC ...... *G06F 11/3089* (2013.01); *G06F 11/3044* (2013.01); *G06F 11/3062* (2013.01)

(58) Field of Classification Search
CPC ............ G06F 11/3044; G06F 11/3062; G06F 11/3089; G06F 1/20; G06F 1/324; G06F 1/3206; G06F 1/3287; G06F 11/3051; G06F 1/183; G06F 11/3006; H05K 7/20563; H05K 7/1498; H05K 7/20209; H05K 7/20836; H05K 7/207; H05K 7/1492;

(Continued)

(56) References Cited

U.S. PATENT DOCUMENTS 6,594,771 B1 *  7/2003  Koerber ............... G06F 1/26
                                                                    713/330
7,109,603 B2 *  9/2006  Wise, Jr. ............ H02J 1/102
                                                                    307/28

(Continued)

FOREIGN PATENT DOCUMENTS

CN            102313506 A       1/2012

OTHER PUBLICATIONS

Chinese Office Action dated Feb. 22, 2017 corresponding to CN Application No. 201410035777.1 and its partial English translation of pp. 3 to7. pp. 1-20.

*Primary Examiner* — Stephanie E Bloss
*Assistant Examiner* — Lisa E Peters
(74) *Attorney, Agent, or Firm* — Winston Hsu

(57) ABSTRACT

A rack management system and a rack management method thereof are disclosed; wherein the storage management system is used for managing a plurality of chassis. The storage management system includes a rack, a resistor cable, a power supply module, a detection module, and a processing module. The rack has a plurality of storage portions for disposing the plurality of chassis respectively. The resistor cable is disposed in the rack for corresponding to each storage space. The power supply module is used for supplying a power signal to the resistor cable. When the plurality of chassis is disposed in the plurality of storage portions, the detection module detects the resistor cable to generate a plurality of detection signals. The processing module records locations of the plurality of chassis based on the plurality of detection signals.

21 Claims, 6 Drawing Sheets

(58) Field of Classification Search
CPC .... H05K 7/14; H02J 1/102; H02J 9/04; H02J 1/108; H02J 9/061; Y10T 307/675; Y10T 307/383; Y10T 307/625; Y02B 60/1217; Y02B 60/1282; G05D 23/1917
USPC ......... 702/182; 713/322, 320, 324; 361/694, 361/687, 695, 719; 454/184
See application file for complete search history.

(56) References Cited

U.S. PATENT DOCUMENTS

| | | | | |
|---|---|---|---|---|
| 7,113,401 | B2* | 9/2006 | Becker | G06F 1/183 165/122 |
| 7,229,294 | B1* | 6/2007 | Patel | H01R 29/00 439/638 |
| 7,603,486 | B2* | 10/2009 | Le | H04B 3/50 379/377 |
| 8,581,551 | B2* | 11/2013 | Seo | G06F 1/26 320/101 |
| 8,593,015 | B2* | 11/2013 | Gottlieb | H02J 1/10 307/87 |
| 9,053,315 | B2* | 6/2015 | Donovan | G06F 21/42 |
| 9,350,169 | B2* | 5/2016 | Che | H02J 1/10 |
| 9,535,479 | B2* | 1/2017 | Yu | G06F 1/26 |
| 2004/0140718 | A1 | 7/2004 | Wise, Jr. | H02J 1/102 307/75 |
| 2005/0068754 | A1* | 3/2005 | Corrado | H05K 7/1454 361/788 |
| 2006/0087813 | A1* | 4/2006 | Becker | G06F 1/183 361/694 |
| 2006/0087814 | A1* | 4/2006 | Brandon | H05K 7/20563 361/694 |
| 2008/0300818 | A1* | 12/2008 | Brey | H05K 7/20745 702/130 |
| 2009/0219536 | A1* | 9/2009 | Piazza | G01S 5/16 356/445 |
| 2010/0141282 | A1* | 6/2010 | Heath | H04L 12/10 324/704 |
| 2011/0187503 | A1* | 8/2011 | Costa | H05K 7/1498 340/8.1 |
| 2011/0307746 | A1* | 12/2011 | Sullivan | G06F 11/3031 714/57 |
| 2012/0054527 | A1* | 3/2012 | Pfeifer | G06F 1/266 713/340 |
| 2012/0092811 | A1* | 4/2012 | Chapel | H04L 12/10 361/622 |
| 2012/0104856 | A1* | 5/2012 | Gottlieb | H02J 1/10 307/66 |
| 2012/0151242 | A1* | 6/2012 | McGrath | G06F 11/3062 713/340 |
| 2012/0228946 | A1* | 9/2012 | Sim | H01M 2/024 307/80 |
| 2014/0006793 | A1* | 1/2014 | Donovan | G06F 21/42 713/182 |
| 2014/0063752 | A1* | 3/2014 | Sisler | H02J 9/061 361/728 |
| 2014/0084690 | A1* | 3/2014 | Cho | H01M 10/425 307/43 |
| 2014/0177736 | A1* | 6/2014 | Alshinnawi | H04B 3/54 375/257 |
| 2014/0189077 | A1* | 7/2014 | Bauer | H04L 67/18 709/220 |
| 2014/0281614 | A1* | 9/2014 | Mick | G05D 23/1917 713/322 |
| 2014/0285156 | A1* | 9/2014 | Mukaitani | G01R 31/3624 320/134 |
| 2015/0121113 | A1* | 4/2015 | Ramamurthy | H02J 9/061 713/340 |
| 2015/0220134 | A1* | 8/2015 | Zhou | G06F 1/189 713/320 |

\* cited by examiner

RACK MANAGEMENT SYSTEM AND RACK MANAGEMENT METHOD THEREOF

BACKGROUND OF THE INVENTION

1. Field of the Invention

The present invention relates to a rack management system and a rack management method thereof, and more particularly, to a rack management system using a resistor cable to detect locations of the chassis and a rack management method thereof.

2. Description of the Related Art

Cloud computing applications are becoming more popular and creating demands for more computer and server chassis used in the central office. Traditionally, in managing network equipment, it requires recording the locations of chassis and their respective racks manually in order to locate the mal-functioned network equipment if any failure happens. However, it is troublesome and complicated to record locations of all network equipment, and it requires additional works, such as setting up the whole networking environment and updating records again when there's any change to the location of the network equipment, or any network equipment being added/removed. If the administrator fails to update the location record, then it is difficult to find out the network equipment to be repaired or maintained.

Therefore, it is necessary to provide a novel rack management system and a rack management method thereof to solve the deficiencies of the prior art techniques.

SUMMARY OF THE INVENTION

It is an object of the present invention to provide a rack management system which uses a resistor cable to detect locations of chassis.

It is another object of the present invention to provide a method for the rack management system.

In order to achieve the above objects, the present invention provides a rack management system for managing a plurality of chassis, the rack management system comprising at least one rack, at least one resistor cable, a power supply module, a detection module, and a processing module. The at least one rack comprises a plurality of storage portions for disposing the plurality of chassis respectively. The at least one resistor cable is disposed in the at least one rack for corresponding to each storage space. The power supply module is electrically connected to the at least one resistor cable and supplying a power signal to the at least one resistor cable. The detection module is electrically connected to the at least one resistor cable, when the plurality of chassis is disposed in the plurality of storage portions and is electrically connected to a plurality of locations of the at least one resistor cable respectively, the detection module detects the at least one resistor cable to generate a plurality of detection signals. The processing module is electrically connected to the detection module and obtaining locations of the plurality of chassis based on the plurality of detection signals.

The rack management method comprises the following steps: supplying a power signal to at least one resistor cable, wherein the at least one resistor cable is disposed in the at least one rack to correspond to each storage space; when the plurality of chassis is disposed in the plurality of storage portions, the plurality of chassis is electrically connected to different locations of the at least one resistor cable respectively to generate correspondingly a plurality of detection signals; and obtaining locations of the plurality of chassis based on the plurality of detection signals.

DETAILED DESCRIPTION OF THE PREFERRED EMBODIMENT

The advantages and innovative features of the invention will become more apparent from the following detailed description when taken in conjunction with the accompanying drawings.

Figure 1:
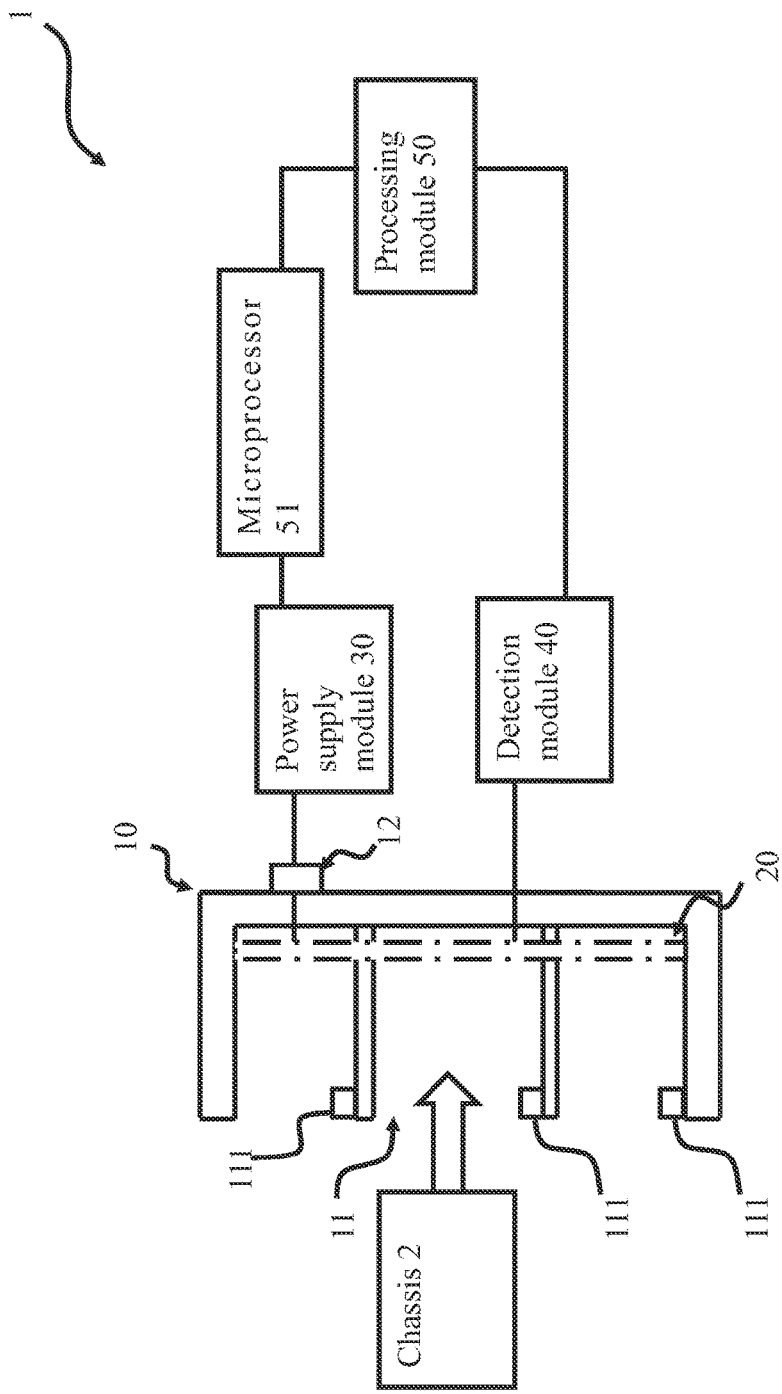
FIG. 1 illustrates a system structure of a rack management system of the present invention.

Please refer to FIG. 1 for a system structure of a rack management system of the present invention.

The rack management system 1 is provided for managing a plurality of chassis 2, which can be mainframes, servers, hard drives, or any other network equipment, or any other casings without networking functions. The plurality of chassis 2 is disposed in the same area, such as in the same office, thereby allowing the rack management system 1 to keep tack of the locations of the plurality of chassis 2 disposed in a rack 10 for later rack management. The rack management system 1 comprises at least one rack 10, at least one resistor cable 20, a power supply module 30, a detection module 40, and a processing module 50. The at least one rack 10 comprises a plurality of storage portions 11 for disposing the plurality of chassis 2 respectively; furthermore, there can be more than one rack 10 in the same area. The resistor cable 20 is disposed in the rack 10, the resistor cable 20 comprises evenly distributed resistance values to correspond to each storage space 11. Therefore, the resistance difference is the same between adjacent storage portions 11.

The power supply module 30 is electrically connected to one end the resistor cable 20 and supplying a power signal, such as a 12V power signal to the resistor cable 20. The resistor cable 20 has another end grounded to set the voltage difference between two adjacent storage portions 11 to be the same. The detection module 40 is electrically connected to the resistor cable 20; when a plurality of chassis 2 is disposed in the plurality of storage portions 11, the plurality of chassis is electrically connected to different locations of the resistor cable respectively to generate a plurality of detection signals. The detection module 40 can detect voltage values or current values of the resistor cable 20 according to requirements of different embodiments, since the resistor cable 20 comprises evenly distributed resistance values, the detection module 40 can obtain location signals of different voltage or current values at different storage portions 11. Detailed operations of the detection module 40 will be described later with reference to FIG. 2 and FIG. 5.

The processing module 50 is electrically connected to a plurality of detection modules 40 to record the locations of the plurality of chassis 2 based on the plurality of detection signals provided by the plurality of detection modules 40. It is not necessary to dispose the processing module 50 and the rack 10 in the same area; it is possible that the processing module 50 can receive the signals from the detection module 40 via a network. Therefore, it is convenient for the administrator to know the locations of the plurality of chassis 2.

Besides, the rack management system 1 can further comprise a microprocessor 51 for the processing module 50 to control the time of the power supply module 30 supplying the power signal. There can be a microprocessor 51 in each office, the microprocessor 51 is connected to different racks 10 and their respective power supply modules 30, and the microprocessor 51 can be connected to the processing module 50. Therefore, the processing module 50 can use the microprocessor 51 to control the power supply module 30 to supply the power signal. On the other hand, each rack 10 can comprise a switch 12. In this case, the processing module 50 can use the switch 12 to control the power supply module 30 to supply the power signal to a designated storage space. Even the power supply module 30 can be connected to a network to be directly controlled by the processing module 50 and to supply the power signal. The rack management system 1 can comprise the microprocessor 51, the switch 12 or the network-connected power supply module 30 at the same time or only one or two of them.

Additionally, the power supply module 30 can continuously supply a power signal to the plurality of resistor cables 20 to allow the processing module 50 to detect the location of the chassis 2 at any time. To save power, the processing module 50 can control the power supply module 30 to supply the power signal in an interval of a specific period of time. In an alternative embodiment, the rack 10 further comprises a plurality of switching modules 111 corresponding to the plurality of storage portions 11. Therefore, when any chassis 2 is disposed in any storage space 11, a corresponding switching module 111 would generate and send a switching signal to the processing module 50. According to the switching signal, the processing module 50 controls the power supply module 30 to supply the power signal to carry out the process described above. In this way, the processing module 50 can scan the rack 10 when a chassis 2 is added or removed, thereby updating the locations of the plurality of chassis 2 at any time. Also, the detection module 40 can report to the rack management system 1 automatically. When a chassis 2 is added or removed, the detection module 40 can detect any change in the detection signals and transmit the updated detection signals to the processing module 50.

Figure 2:
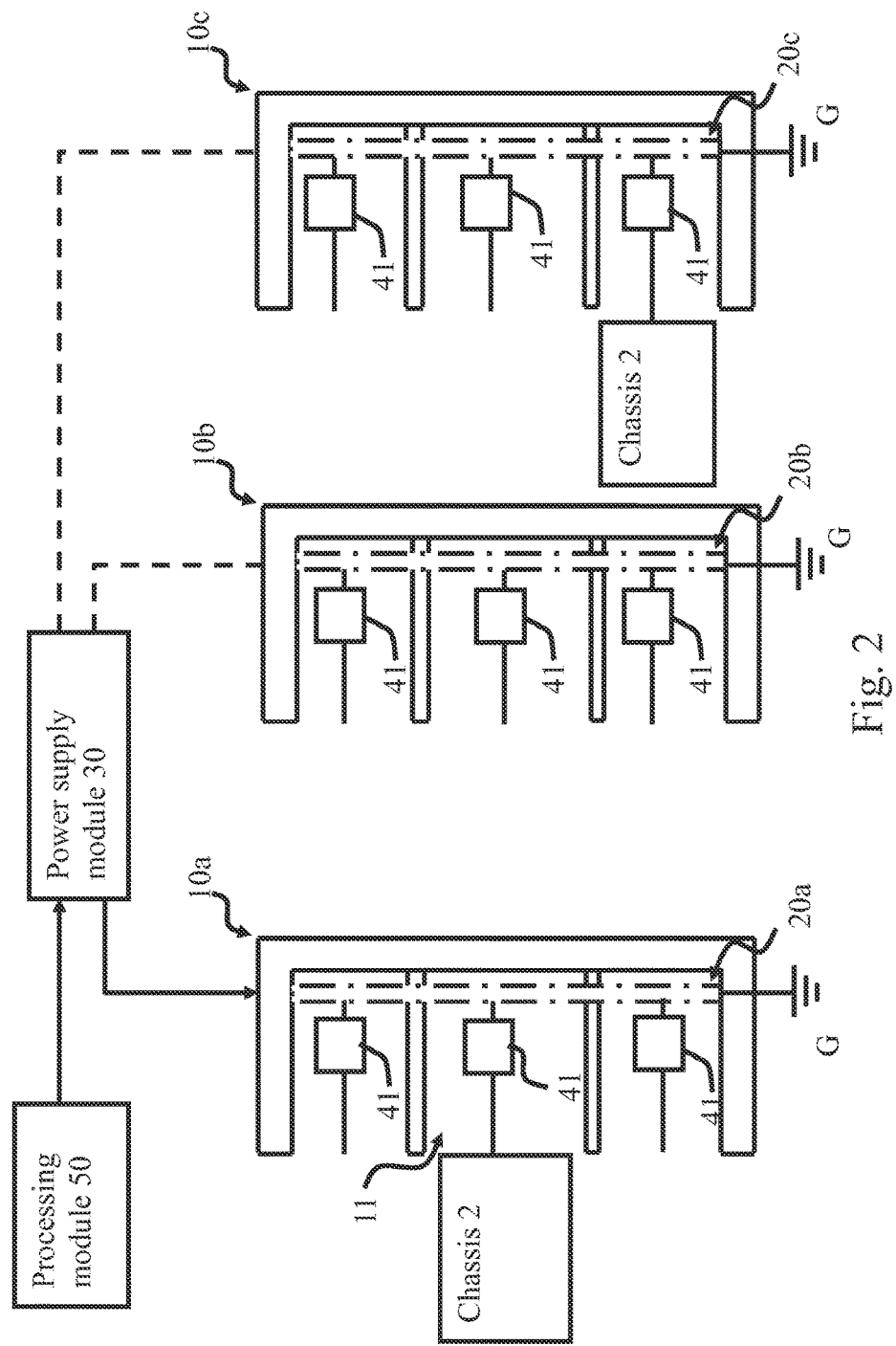
FIG. 2 illustrates a structural view of a first embodiment of the rack management system of the present invention.

Please refer to FIG. 2 for a structural view of a first embodiment of the rack management system of the present invention.

In the first embodiment of the present invention, the rack management system 1 comprises a plurality of racks 10a, 10b, 10c, each rack comprising a resistor cables 20a, 20b, 20c respectively, with each resistor cable 20a, 20b, 20c having one end connected to the ground terminal G. The detection module 40 comprises a plurality of voltage detection modules 41, wherein the plurality of voltage detection modules 41 can be disposed in the chassis 2 or the storage portions 11; when the plurality of chassis 2 is disposed in the plurality of storage portions 11, any voltage detection module 41 can detect a voltage value of any chassis 2 contacting the resistor cable 20 to obtain a corresponding detection signal. For example, when the power supply module 30 supplies a 12V power signal and the rack 10a comprises 48 storage portions 11, then each resistor cable 20a, 20b, or 20c in each storage space 11 would experience a 0.25V voltage difference linearly as compared with an adjacent storage space 11. Therefore, when the voltage detection module 41 detects the voltage value of the storage space 11, it is easy to obtain the location of the storage space 11. Besides, when the rack management system 1 comprises a plurality of racks 10a, 10b, 10c, in the first embodiment of the present invention, the processing module 50 controls the power supply module 30 to supply the power signal of the same voltage value to each resistor cable 20a, 20b, 20c of each rack 10a, 10b, 10c respectively. After the detection module 40 has detected the voltage value of the rack 10a, the power supply module 30 supplies the power signal to the resistor cable 20b of rack 10b. Therefore, the detection modules 40 on different racks 10a, 10b, 10c obtain the detection signals at different times; even if the detection signals are of the same value, the processing module 50 can find out the correct locations of the plurality of chassis 2 based on the detection times and provide a time chart for later management.

Figure 3:
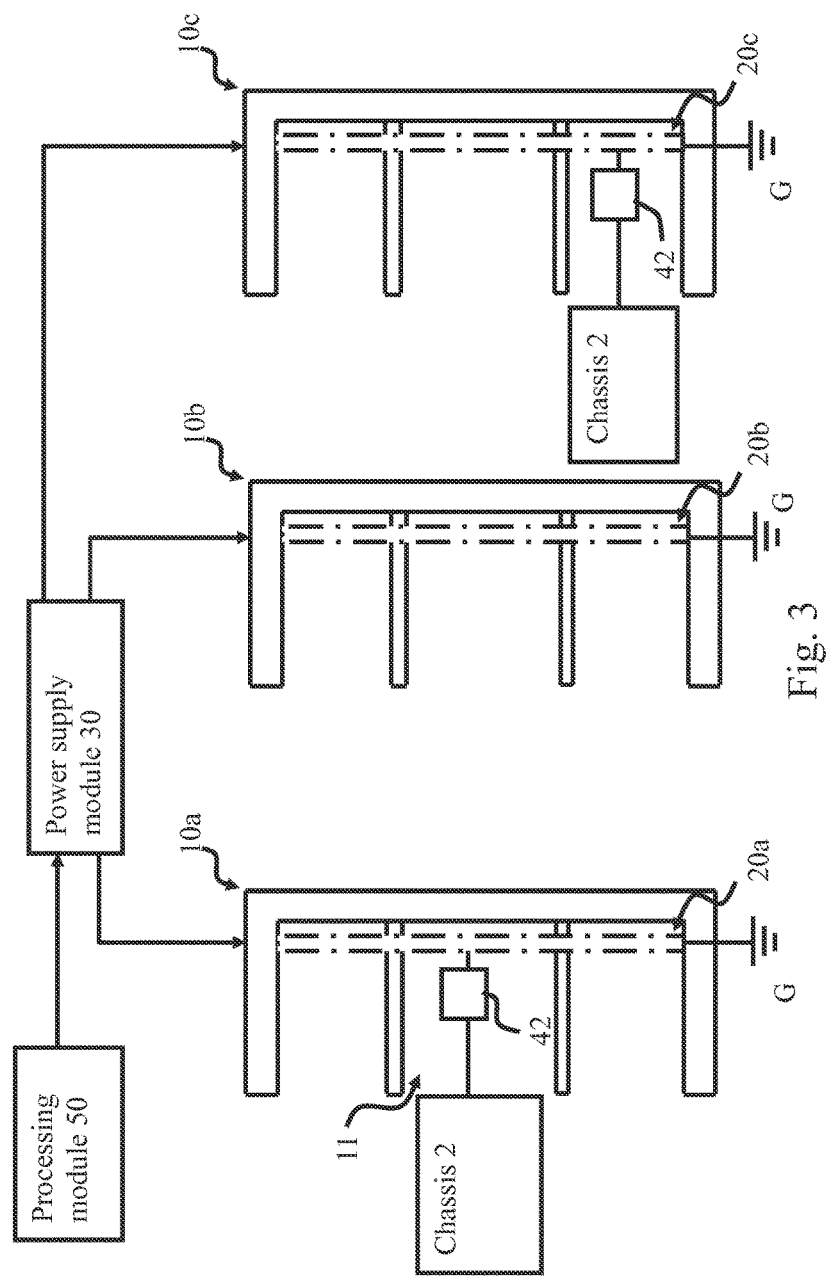
FIG. 3 illustrates a structural view of a second embodiment of the rack management system of the present invention.

Please refer to FIG. 3 for a structural view of a second embodiment of the rack management system of the present invention.

In the second embodiment of the present invention, the rack management system 1 also comprises a plurality of racks 10a, 10b, 10c, the power supply module 30 can supply power signals of different voltage values to the resistor cables 20a, 20b, 20c of the rack 10a, 10b, 10c respectively, with each resistor cable 20a, 20b, 20c having one end connected to the ground terminal G. For example, the processing module 50 controls the power supply module 30 to supply a 4V power signal to the resistor cable 20a of the rack 10a, a 5V power signal to the resistor cable 20b of the rack 10b, and a 6V power signal to the resistor cable 20c of the rack 10c; thereby allowing voltage detection module 41 on different racks to detect different voltage values. In this way, the processing module 50 can find out all the locations of the plurality of chassis 2.

Furthermore, the resistor cables 20a, 20b, 20c can have different resistance characteristics. For example, when the resistance value of the resistor cable 20a is 4 ohm, the resistance value of the resistor cable 20b is 5 ohm, and the resistance value of the resistor cable 20c is 6 ohm, the processing module 50 can control the power supply module 30 to supply the power signals of the same voltage to the resistor cables 20a, 20b, 20c, and the voltage detection modules 41 at different locations can detect different voltage values. In this way, the processing module 50 can find out all the locations of the plurality of chassis 2 based on different voltage values.

Figure 4:
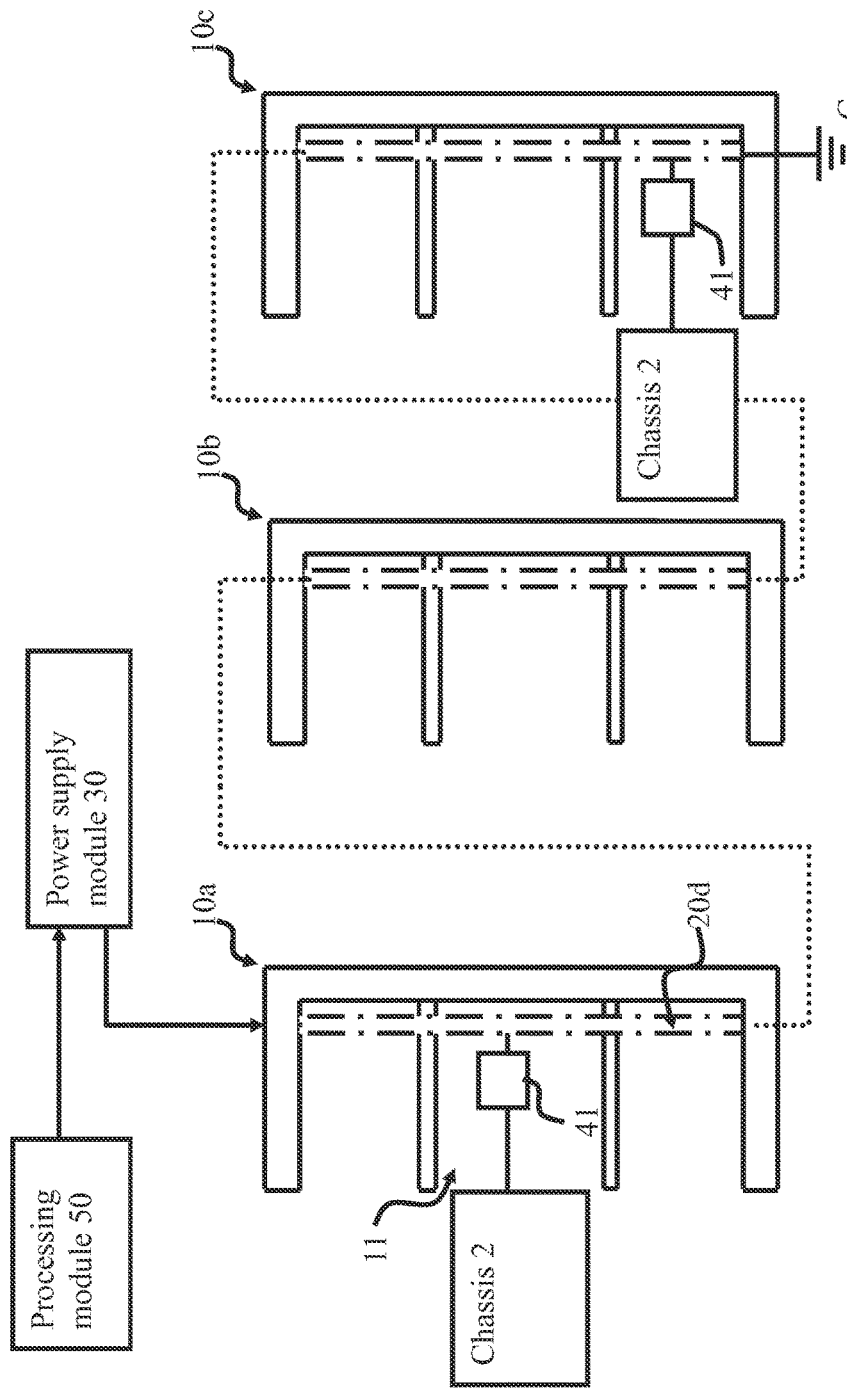
FIG. 4 illustrates a structural view of a third embodiment of the rack management system of the present invention.

Please refer to FIG. 4 for a structural view of a third embodiment of the rack management system of the present invention.

Alternatively, the rack management system 1 comprises a plurality of racks 10a, 10b, 10c, a resistor cable 20d connects the plurality of racks 10a, 10b, 10c in series; therefore, the power supply module 30 supplies the power signal to rack 10a, and the resistor cable 20d connects to the ground terminal G via rack 10c. Hence, when the power supply module 30 supplies the power signal to the resistor cable 20d, the voltage detection module 41 can detect different voltage values at different racks; finally, the processing module 50 can find out all the locations of the plurality of chassis 2 based on different voltage values.

Figure 5:
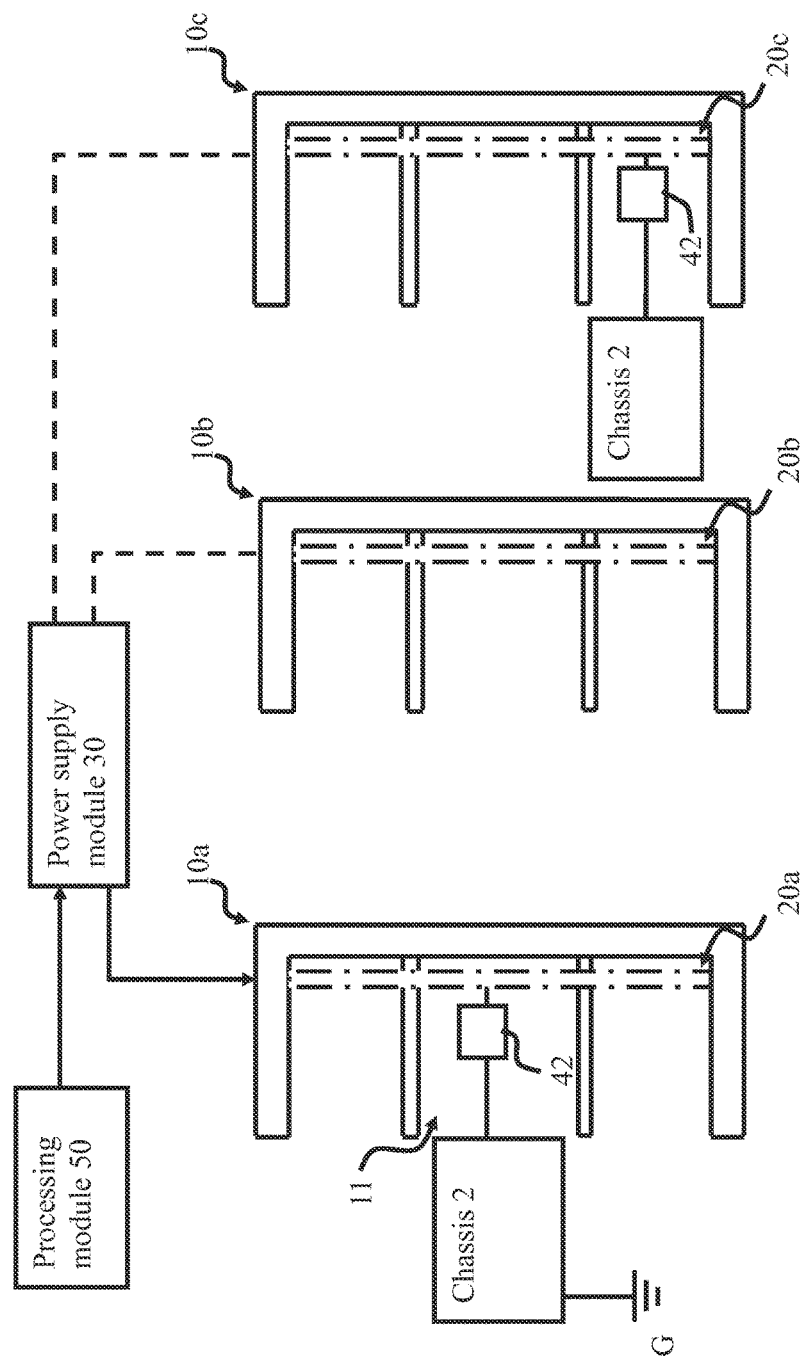
FIG. 5 illustrates a structural view of a fourth embodiment of the rack management system of the present invention.

Please refer to FIG. 5 for a structural view of a fourth embodiment of the rack management system of the present invention.

In the fourth embodiment of the present invention, the detection module 40 can be a current detection module 42 for detecting a current value of a current flowing through the resistor cable 20. When the plurality of chassis 2 is disposed in the plurality of storage portions 11, the processing module 50 sets one of the chassis 2 to be connected to the ground terminal G, or the chassis 2 can be initially connected to the ground terminal G; therefore, the current detection module 42 can detect the current value of the resistor cable 20 at different locations. Then the processing module 50 can find out all the locations of the plurality of chassis 2 based on different current values. When the rack management system 1 comprises a plurality of racks 10a, 10b, 10c, the circuit configuration of the resistor cables 20a, 20b, 20c can be the same as those shown in the first, second and third embodiments. The current detection module 42 can also find out all the locations of the plurality of chassis 2 based on the circuit configurations shown in the first, second and third embodiments.

It is noted that the above-mentioned modules can be implemented as hardware devices, software programs, firmware, or a combination thereof, or implemented as circuits or any other suitable configuration; besides, the modules can be implemented as independent devices or a device having multiple function, or the combination thereof. In a preferred embodiment of the present invention, all the modules are software programs stored in a memory and executed by the processor. The present invention is illustrated only with preferred embodiments; however, there are other possible implementations or combinations for the present invention. A person known in the art should realize that not all the components and modules are necessary, other traditional modules or components might be used in the present invention. Besides, all the components or modules can be omitted or modified based on different requirements; two connected components/modules might have additional components/modules disposed therebetween.

Figure 6:
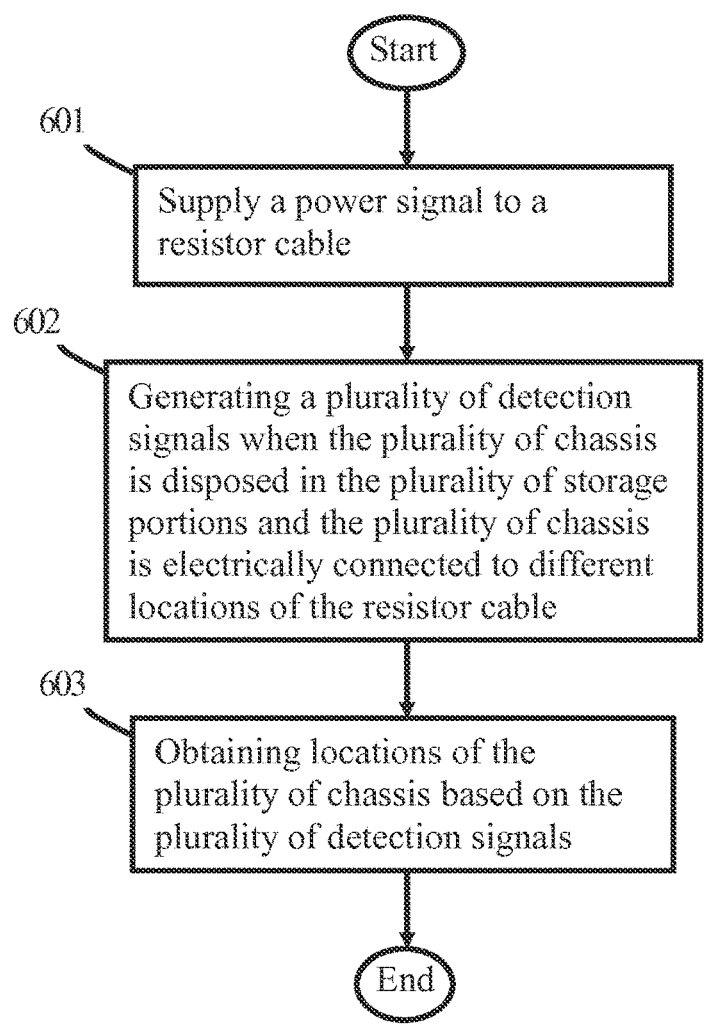
FIG. 6 illustrates a flow chart of the rack management method of the present invention.

Please refer to FIG. 6 for a flow chart of the rack management method of the present invention. It is noted that although the rack management method is illustrated with reference to the rack management system 1, the rack management method can be used in system other than the rack management system 1.

The method first goes to step 601: supply a power signal to a resistor cable.

First the processing module 50 controls the power supply module 30 to supply the power signal to the resistor cable 20. The power supply module 30 can supply the power signal to the plurality of racks 10 continuously, or in an interval of a specific period of time; or the power supply module 30 can supply the power signal only when the switching module 111 generates the switching signal. It is noted that the power supply module 30 can be triggered by other mechanisms.

Then the method first goes to step 602: generating a plurality of detection signals when the plurality of chassis is disposed in the plurality of storage portions and the plurality of chassis is electrically connected to different locations of the resistor cable.

When the plurality of chassis 2 is disposed in the plurality of storage portions 11, the plurality of chassis 2 can contact the resistor cable 20 at different locations respectively, thereby allowing the detection module 40 to obtain the detection signals. The detection module 40 can be voltage detection modules 41, which detect different voltage signals at different locations of the plurality of chassis 2. For example, the power supply module 30 supplies different power signals of different voltage values to different resistor cables 20; or the power supply module 30 sequentially supplies the same power signal to different resistor cables 20; or the power supply module 30 supplies the same power signal to different resistor cables 20 (that is, having different resistance characteristics) at the same time. By using any one of the above-described configurations, the detection module 40 can obtain the detection signals, or the detection module 40 can obtain the detection signals based on other possible configurations. Besides, the detection module 40 can be current detection modules 42 which detect different current signals at different locations of the plurality of chassis 2. The detection module 40 is controlled by the processing module 50 to detect the voltage or current signals, or the detection module 40 can detect the voltage or current signals spontaneously and then send the obtained detection signals to the processing module 50; or the detection module 40 can have other triggering mechanisms.

Finally the method goes to step 603: obtaining locations of the plurality of chassis based on the plurality of detection signals.

The processing module 50 obtains the locations of the plurality of chassis 2 based on the plurality of detection signals provided by the detection module 40 and records the locations as charts or diagrams for later management.

It is noted that the rack management method is not limited to the order of steps described above; the rack management method can have any other order of steps as long as it fulfills the objects of the present invention.

The present invention discloses the rack management system 1 and the method thereof to easily keep track of the locations of the plurality of chassis 2 without the need of recording and updating the locations of network equipment manually, thereby effectively reducing the possibility of generating inaccurate records due to carelessness or negligence.

It is noted that the above-mentioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. A rack management system for managing a plurality of chassis, the rack management system comprising:
at least one rack comprising a plurality of storage portions for disposing the plurality of chassis respectively;
at least one resistor cable disposed in the at least one rack corresponding to each storage portion;
a power supply module being electrically connected to the at least one resistor cable and supplying a power signal to the at least one resistor cable;
a processing module; and
a detection module only electrically connected to the at least one resistor cable and the processing module, wherein the detection module is independent from the plurality of chassis and uses the power signal supplied by the power supply module to detect whether the plurality of chassis is disposed in the plurality of storage portions and is electrically connected to a plurality of locations of the at least one resistor cable respectively, so as to generate a plurality of detection signals;

wherein the processing module obtains locations of the plurality of chassis based on the plurality of detection signals.

2. The rack management system as claimed in claim 1, wherein the detection module comprises a plurality of voltage detection modules; any voltage detection module detects a voltage value of the at least one resistor cable contacting any chassis to obtain a corresponding detection signal.

3. The rack management system as claimed in claim 1, wherein the detection module is a current detection module, wherein the processing module grounds one of the plurality of chassis when the plurality of chassis is disposed in the plurality of storage portions, so as to allow the current detection module to detect a current value of the at least one resistor cable to obtain a corresponding detection signal.

4. The rack management system as claimed in claim 1, wherein the rack management system comprises a plurality of racks and a plurality of resistor cables, and the plurality of resistor cables is connected in series with each another.

5. The rack management system as claimed in claim 1, wherein the rack management system comprises a plurality of racks and a plurality of resistor cables, and the power supply module supplies a plurality of power signals of different voltage values to the plurality of resistor cables respectively, so as to allow the plurality of voltage detection modules to detect the plurality of detection signals of different voltage values.

6. The rack management system as claimed in claim 1, wherein the rack management system comprises a plurality of racks and a plurality of resistor cables, and the power supply module supplies a plurality of power signals of the same voltage value to the plurality of resistor cables sequentially, so as to allow the plurality of voltage detection modules to detect the plurality of detection signals in different times.

7. The rack management system as claimed in claim 1, wherein the rack management system comprises a plurality of racks and a plurality of resistor cables, each resistor cable comprises a resistance characteristic different from the resistance characteristics of other resistor cables, and the power supply module supplies the same power signal to the plurality of resistor cables respectively.

8. The rack management system as claimed in claim 1, further comprising a microprocessor, wherein the processing module uses the microprocessor to control the power supply module to supply the power signal.

9. The rack management system as claimed in claim 1, wherein each rack further comprises a switch, and the processing module uses the switch to control the power supply module to supply power signals to the plurality of resistor cables respectively.

10. The rack management system as claimed claim 1, wherein the power supply module comprises a networking function to directly receive a control signal from the processing module to supply the power signal.

11. The rack management system as claimed in claim 1, wherein the power supply module supplies the power signal to the at least one resistor cable in an interval of a specific period of time.

12. The rack management system as claimed in claim 1, wherein the rack further comprises a plurality of switching modules corresponding to the plurality of storage portions respectively; when any chassis is disposed in any storage portion, a corresponding switching module generates and sends a switching signal to the processing module; then the processing module uses the switching signal to control the power supply module to supply the power signal.

13. A rack management method for a rack management system to manage a plurality of chassis, wherein the rack management system comprises at least one rack comprising a plurality of storage portions for disposing the plurality of chassis respectively, the method comprising the following steps:
  supplying a power signal to at least one resistor cable, wherein the at least one resistor cable is disposed in the at least one rack and comprises evenly distributed resistance values to correspond to each storage portion;
  using, by a detection module, the power signal to detect whether the plurality of chassis is disposed in the plurality of storage portions and is electrically connected to a plurality of locations of the at least one resistor cable respectively, so as to generate a plurality of detection signals; and
  obtaining, by a processing module, locations of the plurality of chassis based on the plurality of detection signals;
  wherein the detection module is only electrically connected to the at least one resistor cable and the processing module, and the detection module is independent from the plurality of chassis.

14. The rack management method as claimed in claim 13 further comprising the following steps:
  when the plurality of chassis is disposed in the plurality of storage portions, detecting a voltage value of the at least one resistor cable contacting any chassis to obtain a corresponding detection signal.

15. The rack management method as claimed in claim 13 further comprising the following steps:
  grounding any one of the plurality of chassis when the plurality of chassis is disposed in the plurality of storage portions; and
  detecting a current value of the at least one resistor cable to obtain a corresponding detection signal.

16. The rack management method as claimed in claim 13 further comprising a step of connecting the plurality of resistor cables in series with each another.

17. The rack management method as claimed in claim 13 further comprising a step of supplying a plurality of power signals of different voltage values to the plurality of resistor cables respectively to generate correspondingly a plurality of detection signals.

18. The rack management method as claimed in claim 13 further comprising a step of supplying a plurality of power signals of the same voltage value to the plurality of resistor cables sequentially to generate correspondingly a plurality of detection signals.

19. The rack management method as claimed in claim 13, wherein each resistor cable comprises a resistance characteristic different from the resistance characteristics of other resistor cables, and the method further comprises supplying the same power signal to the plurality of resistor cables respectively to generate correspondingly a plurality of detection signals.

20. The rack management method as claimed in claim 13 further comprising a step of supplying the power signal to the at least one resistor cable in an interval of a specific period of time.

21. The rack management method as claimed in claim 13 further comprising the following steps:
  generating a switching signal when any chassis is disposed in any storage portion; and
  supplying the power signal based on the switching signal.

* * * * *